United States Patent [19]
Yanay

[11] Patent Number: 5,830,093
[45] Date of Patent: Nov. 3, 1998

[54] CONTINUOUSLY VARIABLE TRANSMISSION EMPLOYING CABLE WOUND AROUND VARIABLE DIAMETER DRUMS

[76] Inventor: Yosef Yanay, 6 Efroni Street, Karmiel 20100, Israel

[21] Appl. No.: 925,439

[22] Filed: Sep. 8, 1997

[51] Int. Cl.[6] ............................... F16H 9/02; F16H 7/00
[52] U.S. Cl. ............................................. 474/49; 474/64
[58] Field of Search ................................ 474/47, 49, 52, 474/53, 54, 56, 57, 64, 65, 66, 67, 68

[56] References Cited

U.S. PATENT DOCUMENTS 4,810,234  3/1989  Kumm ..................................... 474/49

*Primary Examiner*—Thomas R. Hannon
*Attorney, Agent, or Firm*—Mark M. Friedman

[57] ABSTRACT

A continuously variable transmission system for coupling between a rotating drive shaft and an output shaft employs a first drum rotated by the drive shaft and a second drum connected to the output shaft. At least one, and typically both, of the drums have a region of adjustable effective diameter. A closed cable encircling the first and the second drums is wrapped around each of the first and the second drums a plurality of times so as to provide effective tractional locking even at low clamping forces. In preferred embodiments, a mechanism is provided for preventing creep of the cable along the drum. The mechanism typically includes a number of elements each having a helical groove and deployed such that the cable engages a part of the groove, and a mechanism for rotating the elements so as to change the portion of the groove with which the cable engages.

16 Claims, 19 Drawing Sheets

CONTINUOUSLY VARIABLE TRANSMISSION EMPLOYING CABLE WOUND AROUND VARIABLE DIAMETER DRUMS

FIELD AND BACKGROUND OF THE INVENTION

The present invention relates to continuously variable transmission and, in particular, it concerns a continuously variable transmission system which employs a cable wound around variable diameter drums.

Various systems are known for providing transmission of rotational power from a rotating drive shaft to an output shaft with a continuously variable ratio of input-to-output rates of revolution. Such systems are commonly referred to as "continuously variable transmission" systems (CVT), or equivalently, as "infinitely variable transmission" systems (IVT). Among the most prevalent examples of such systems are the Van-Doorne belt or "V-belt", and the toroidal traction drive. A further example, disclosed in U.S. Pat. No. 4,810,234 to Kumm, employs a belt encompassing a pair of pulleys each having a variable diameter.

Theoretically, because of correct matching of engine speed to the required power, CVT systems should be considerably more efficient than conventional fixed ratio transmissions. In practice, however, energy savings are small or non-existent. Additionally, CVT systems are usually unable to transmit very large torques.

The primary cause of these shortcomings is that CVT systems rely on traction. Since the variable ratios of CVT preclude the use of interlocking gears, transmission of torque is achieved through traction, typically of a belt around two rotating elements. Even with high belt tension or "clamping pressure", frictional losses are further aggravated by some degree of belt slippage. High clamping pressure also leads to problems of reliability.

There is therefore a need for a continuously variable transmission system which achieves effective tractional engagement without requiring high clamping pressure.

SUMMARY OF THE INVENTION

The present invention is a continuously variable transmission system in which input and output drums are coupled by a closed cable which is wound a number of times around each drum.

According to the teachings of the present invention there is provided, a continuously variable transmission system for coupling between a rotating drive shaft and an output shaft, the system comprising: (a) a first drum having an axis of rotation, the first drum being operatively connected to the drive shaft so as to be rotated by the drive shaft; (b) a second drum having an axis of rotation, the second drum being positioned with its axis of rotation substantially parallel to the first drum's axis of rotation, the second drum being operatively connected to the output shaft, wherein at least one of the first drum and the second drum has a region of adjustable effective diameter; and (c) a closed cable encircling the first and the second drums, wherein the cable is wrapped around each of the first and the second drums a plurality of times.

According to a further feature of the present invention, the cable is wrapped around the first drum in a first-handed helix and around the second drum in a second-handed helix of opposite sense to the first-handed helix.

According to a further feature of the present invention, there is also provided a tensioning mechanism operative to maintain tension in the cable.

According to a further feature of the present invention, both the first and the second drums have a region of adjustable effective diameter, and the tensioning mechanism is operatively connected to the first and second drums so as to tend to increase the effective diameter of the region of the first and second drums so as to maintain tension in the cable.

According to a further feature of the present invention, there is also provided an override mechanism for overriding operation of the tensioning mechanism such that frictional engagement between the cable and at least one of the drums is released so as to correspond to a "neutral" transmission state.

According to a further feature of the present invention, at least one of the first and the second drums includes a mechanism for preventing creep of the cable along the drum.

According to a further feature of the present invention, the mechanism for preventing creep of the cable along the drum includes: (a) at least one element having a helical groove deployed such that the cable engages a part of the groove; and (b) a mechanism for rotating the at least one element so as to change the portion of the groove with which the cable engages.

According to a further feature of the present invention, the at least one of the first drum and the second drum which has a region of adjustable effective diameter includes: (a) a plurality of rods deployed radially spaced from, and angularly distributed around, the axis of rotation so as to form an effective drum surface; and (b) an adjustment mechanism for varying the radial spacing from the axis of rotation of at least a part of each of the rods so as to vary an effective diameter of at least a region of the effective drum surface.

According to a further feature of the present invention, the at least one drum further includes a shaft for transferring torque to or from the drum, the shaft being coupled to the adjustment mechanism such that displacement of the shaft along the axis of rotation varies the effective diameter.

According to a further feature of the present invention, the at least one drum includes a mechanism for preventing creep of the cable along the drum, the mechanism including: (a) a helical groove formed in each of the rods such that the cable engages a part of the groove; and (b) a mechanism for rotating the rods relative to the at least one drum so as to change the portion of the groove with which the cable engages.

According to a further feature of the present invention, the mechanism for rotating is configured to maintain the rotational orientation of the plurality of rods constant as viewed in a stationary frame of reference independent of rotation of the at least one drum.

According to a further feature of the present invention, the mechanism for rotating includes a rotating element coupled so as to rotate with the at least one drum about a secondary axis parallel to, but displaced from, the axis of rotation of the at least one drum.

BRIEF DESCRIPTION OF THE DRAWINGS

The invention herein described, by way of example only, with reference to the accompanying drawings, wherein.

DESCRIPTION OF THE PREFERRED EMBODIMENTS

The present invention is a continuously variable transmission system in which input and output drums are coupled by a closed cable which is wound a number of times around each drum.

The principles and operation of a continuously variable transmission system according to the present invention may be better understood with reference to the drawings and the accompanying description.

Figure 1:
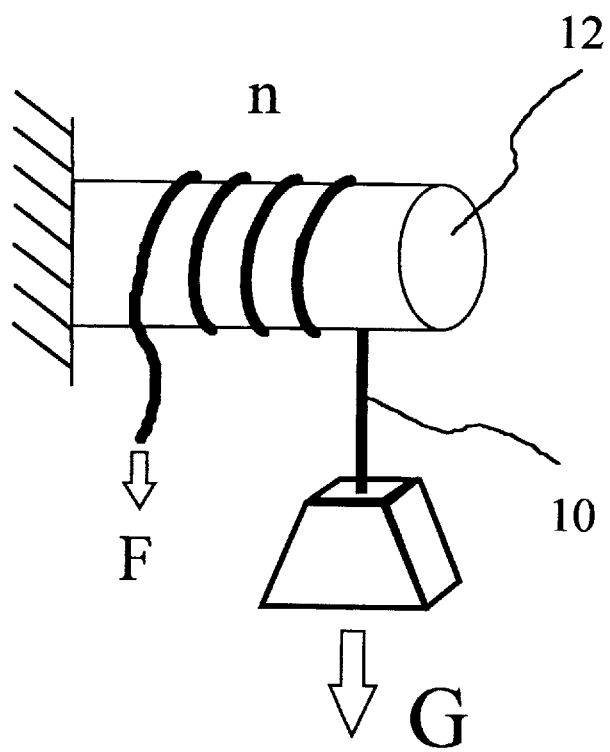
FIG. 1 is a schematic illustration of frictional locking of a cable by winding onto a rod.
Figure 2:
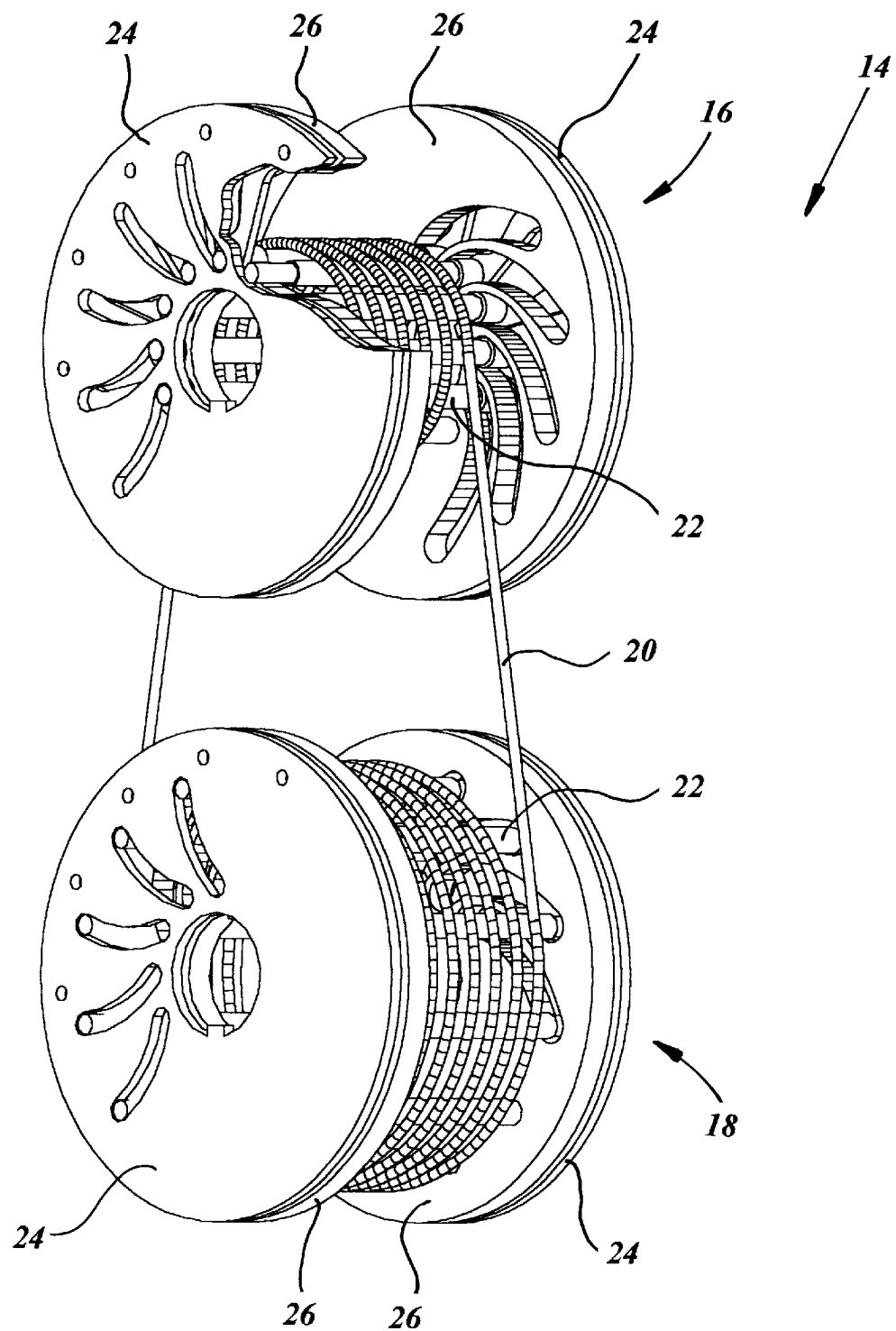
FIG. 2 is a schematic isometric view of a first embodiment of a continuously variable transmission system, constructed and operative according to the teachings of the present invention.

Before addressing the details of the present invention, reference is first made to FIG. 1 which illustrates a principle of self-locking windings which underlies the present invention. FIG. 1 shows a static system in which a cable 10 is wound n+½ times around a fixed rod 12. To one end of cable 10 is attached a weight G. A tensile force F is applied to the other end.

The force F required to resist slipping under application of weight G is given by the relation:

$$F \leq G \cdot e^{-\mu \alpha_{rad}}$$

where $$\alpha_{rad} = 2(n+\tfrac{1}{2})\pi$$

and $\mu$ is the coefficient of friction between the two materials under the given conditions.

For low values of n (for example 0 or 1), the force F required to prevent weight G from descending is close to the value of G, reduced only by small frictional forces. As the number of turns is increased and the frictional forces become greater, the force F required to prevent slipping reduces exponentially. Thus, for given materials, working conditions and theoretical maximum weight G, a certain limit $n_0$ can be defined such that a given relatively small tension $F_0$ will ensure that frictional locking is maintained between cable 10 and rod 12.

According to the teachings of the present invention, an equivalent principle may be used in a dynamic system to achieve tractional locking of a cable around drums without requiring high clamping pressure. Specific examples of implementations of this principle will now be described with reference to FIGS. 2–18.

Referring now to FIGS. 2–13, there is shown a continuously variable transmission system, generally designated 14, constructed and operative according to the teachings of the present invention, for coupling between a rotating drive shaft and an output shaft.

Generally speaking, system 14 has a first drum 16 rotationally linked to the drive shaft and a second drum 18 rotationally linked to the output shaft. The two drums 16 and 18 are positioned spaced apart with their axes of rotation parallel to each other. The drums are rotationally coupled through a closed cable 20 which encircles drums 16 and 18. At least one, and preferably both, of the drums has a region of adjustable effective diameter. By changing the ratio of the effective diameters of the drums, the drive ration between the drive shaft and the output shaft can be continuously adjusted.

It is a particular feature of the present invention that cable 20 is wrapped around each of drums 16 and 18 a plurality of times. The number of windings is chosen to exceed the above-mentioned critical number for the given materials and range of operating conditions. Typically, the number of complete windings on each drum will be at least three, and usually in the range from 4 to about 10, although larger numbers may also be used. As mentioned above, this achieves tractional locking of the cable against the drums, effectively eliminating the slippage which plagues conventional CVT systems without the need for very high tension or large clamping forces.

Before turning to the features of system 14 in more detail, it will be helpful to clarify the usage of a number of terms found in the description and claims. Firstly, it should be clear that the term "drum" is used herein to refer to any revolving structure about which a cable can be wound. Thus, the drums of the present invention have an effective surface which is not necessarily, or even typically, continuous, and need not be cylindrical.

To the extent that the effective surface differs from cylindrical, it should be appreciated that the term "effective diameter" is employed to refer to the average diameter of windings around the part of the drum employed. Thus the effective diameter can readily be calculated as the length of cable in contact with the drum at any instant divided by $\pi n$ where n is the number of windings.

It should also be clear that the term "cable" is used to refer to any flexible cable, belt or chain which is sufficiently strong to transfer the required torque between the drums. The cable may also be formed with any desired cross-sectional shape including, but not limited to, circular and flat belt forms. Preferably, the cable is substantially non-elastic under the normal working conditions of the system. Preferred examples include, but are not limited to, wound steel cable and high-tension polymer cables such as Kevlar®.

Turning now to the features of system 14 in more detail, cable 20 is wrapped around drum 16 in a first-handed helix and around drum 18 in an opposite-handed helix. In the example shown, the helix of drum 16 is right-handed and that of drum 18 is left-handed. Although this example will be used throughout the description, it will be clear that the "handedness" of the entire system could be reversed without in any way changing the operation of the system.

The effective surface of each drum is preferably formed by a plurality of rods 22, parallel to, and radially spaced from, and angularly distributed around, the drum's axis of rotation. The regions of variable effective diameter, in this case extending along substantially the entire length of each drum, operate by varying the radial spacing of rods 22. Thus, in the example shown in FIG. 2, input drum 16 has rods 22 radially retracted corresponding to a minimum effective diameter while output drum 18 has rods 22 radially spread corresponding to a maximum effective diameter.

The principles of operation of a preferred system for varying the radial spacing of the rods will now be described with reference to FIGS. 2–7. Each drum features a pair of positioning discs 24 and a pair of adjustment discs 26.

Figure 3:
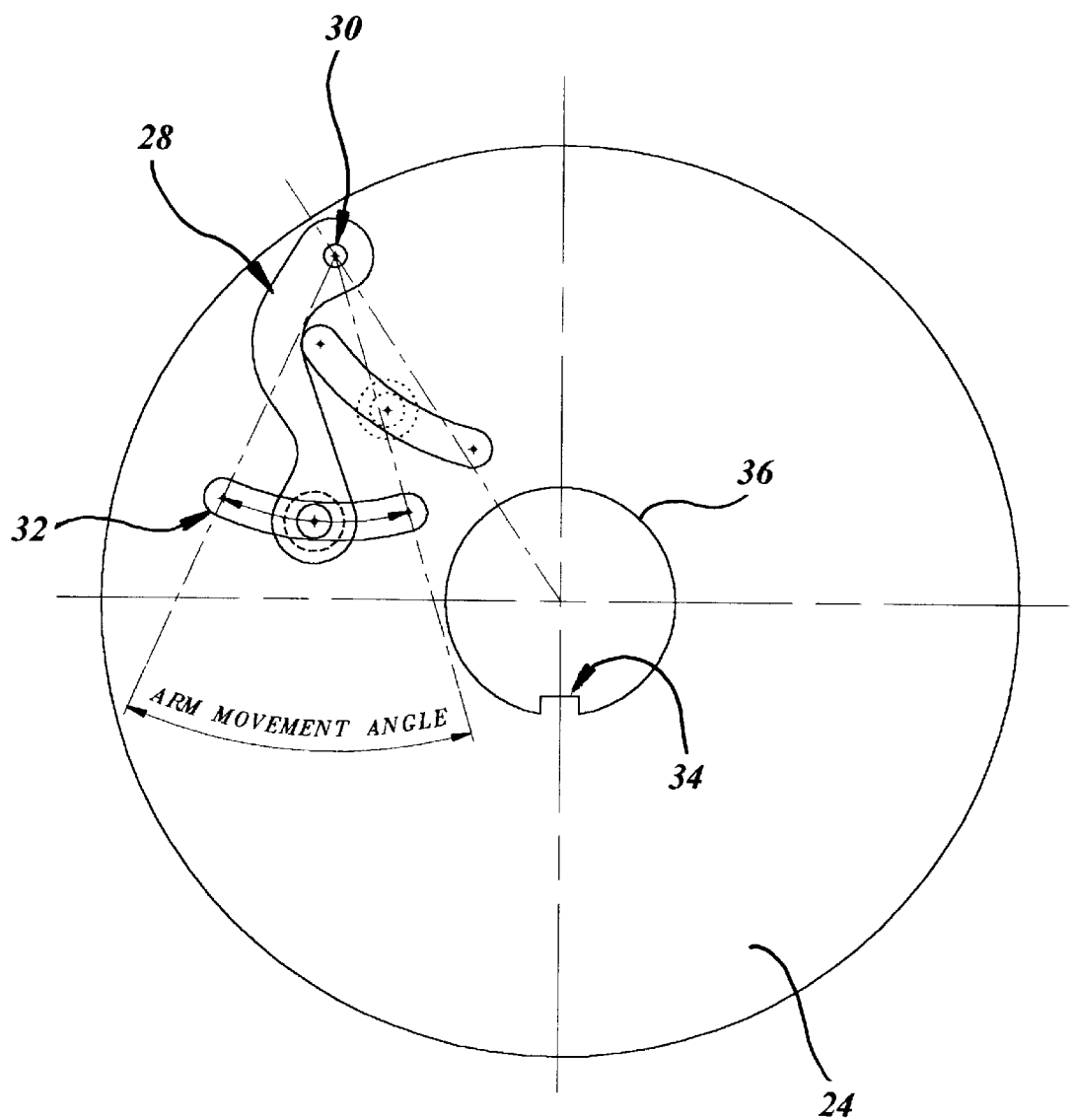
FIG. 3 is a schematic side view of a positioning disc for use in the continuously variable transmission system of FIG. 2.

FIG. 3 shows a schematic illustration of the structure of positioning discs 24. Each disc 24 features a number of pivotally attached arms 28 mounted near one end at pivots 30, typically near the periphery of the disc. The other end of each arm 28 is free to move in an arcuate path, typically corresponding to a curved slot 32 through the disc. Pivots 30, arms 28 and slots 32 are preferably spaced evenly around disc 24.

Disc 24 is also provided with features for maintaining angular alignment, implemented here as an alignment projection 34 within a central opening 36.

Figure 4:
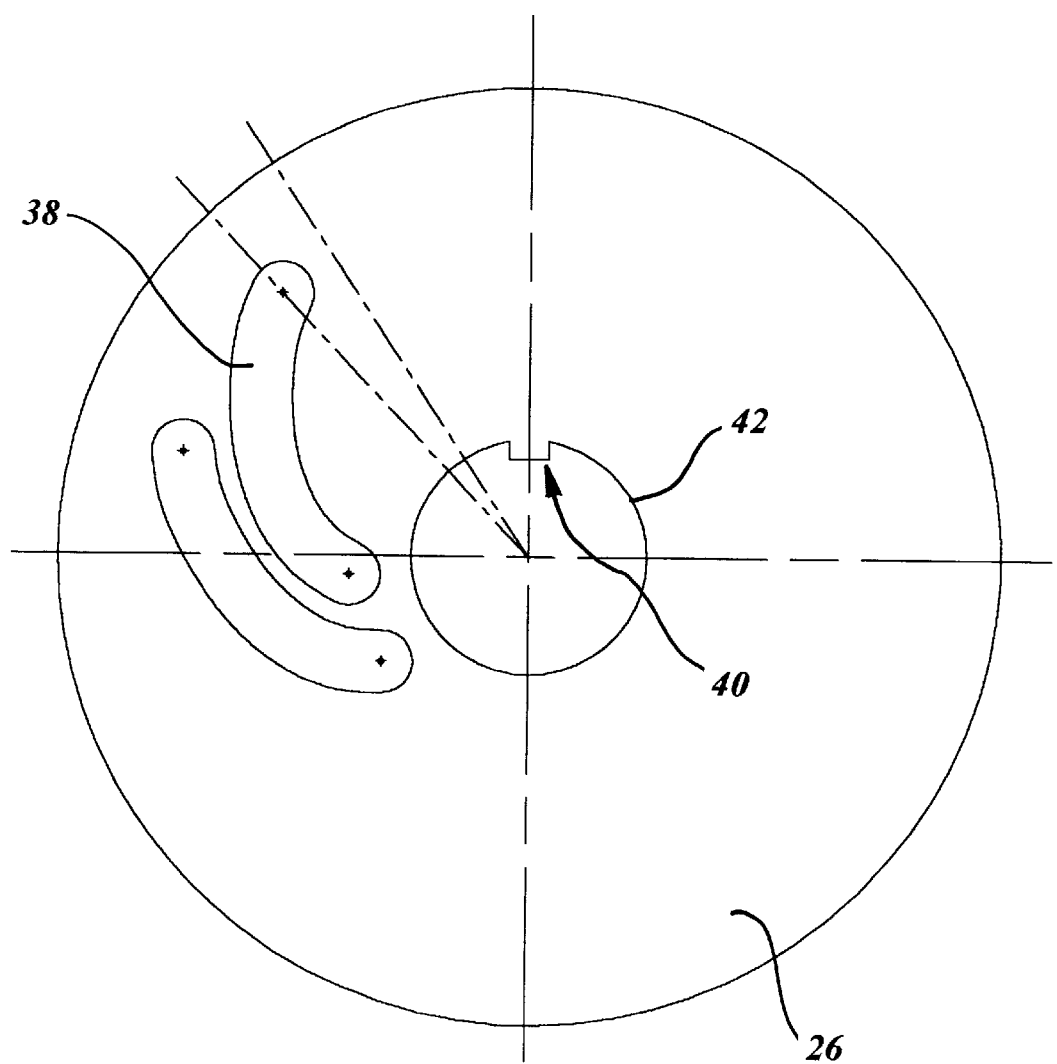
FIG. 4 is a schematic side view of an adjustment disc for use in the continuously variable transmission system of FIG. 2.

Adjustment disc 26, shown in FIG. 4, features a corresponding adjustment slot 38 for each arm 28. Angular alignment may also be achieved here by provision of an alignment projection 40 within central opening 42.

Figure 5:
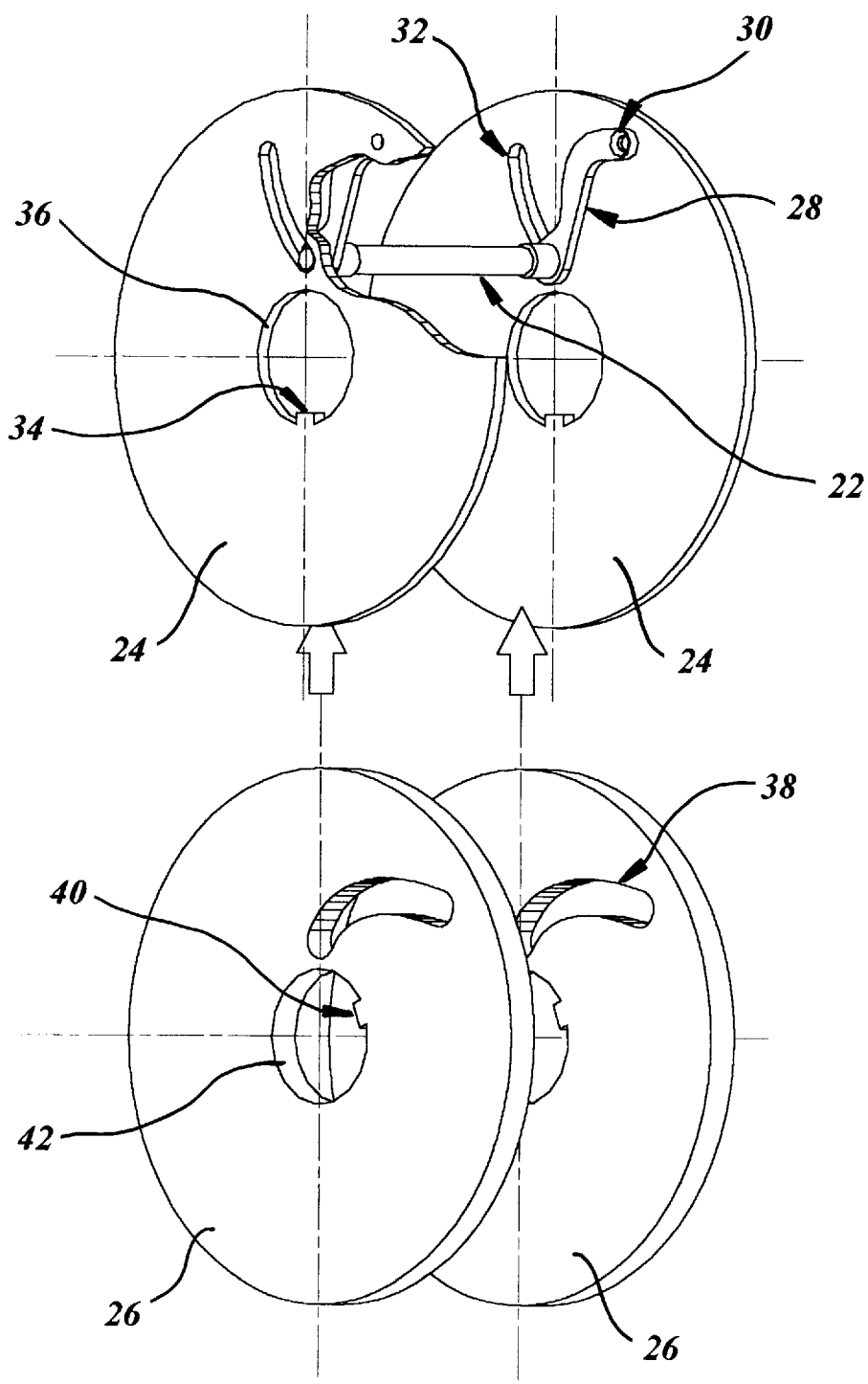
FIG. 5 is a schematic exploded isometric view showing a drum constructed from two positioning discs of FIG. 3 and two adjustment discs of FIG. 4.
Figure 6A:
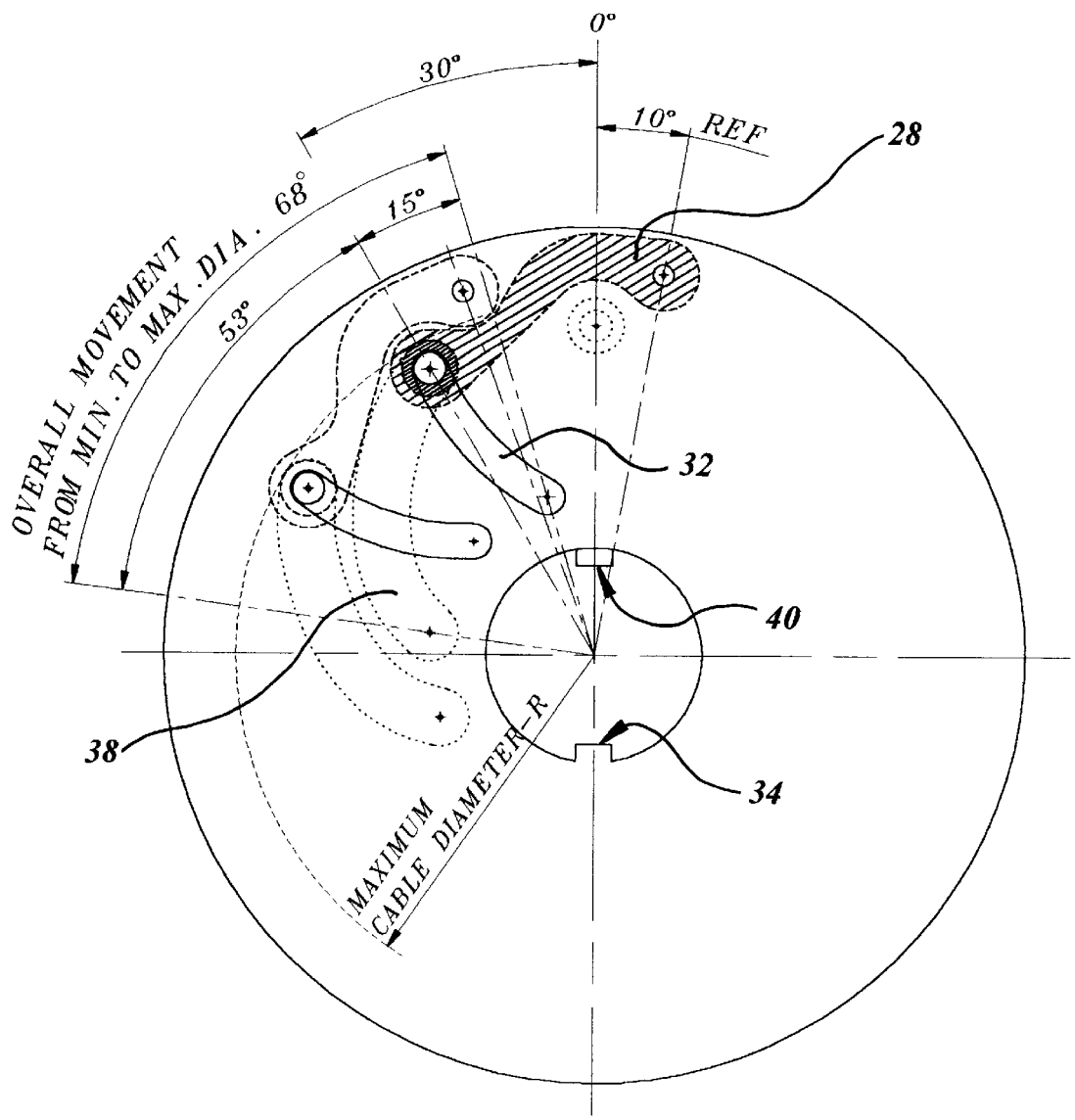
FIG. 6A is a schematic side view of the drum of FIG. 5 showing a first relative position of the positioning discs and adjustment discs corresponding to a maximum effective diameter.
Figure 6B:
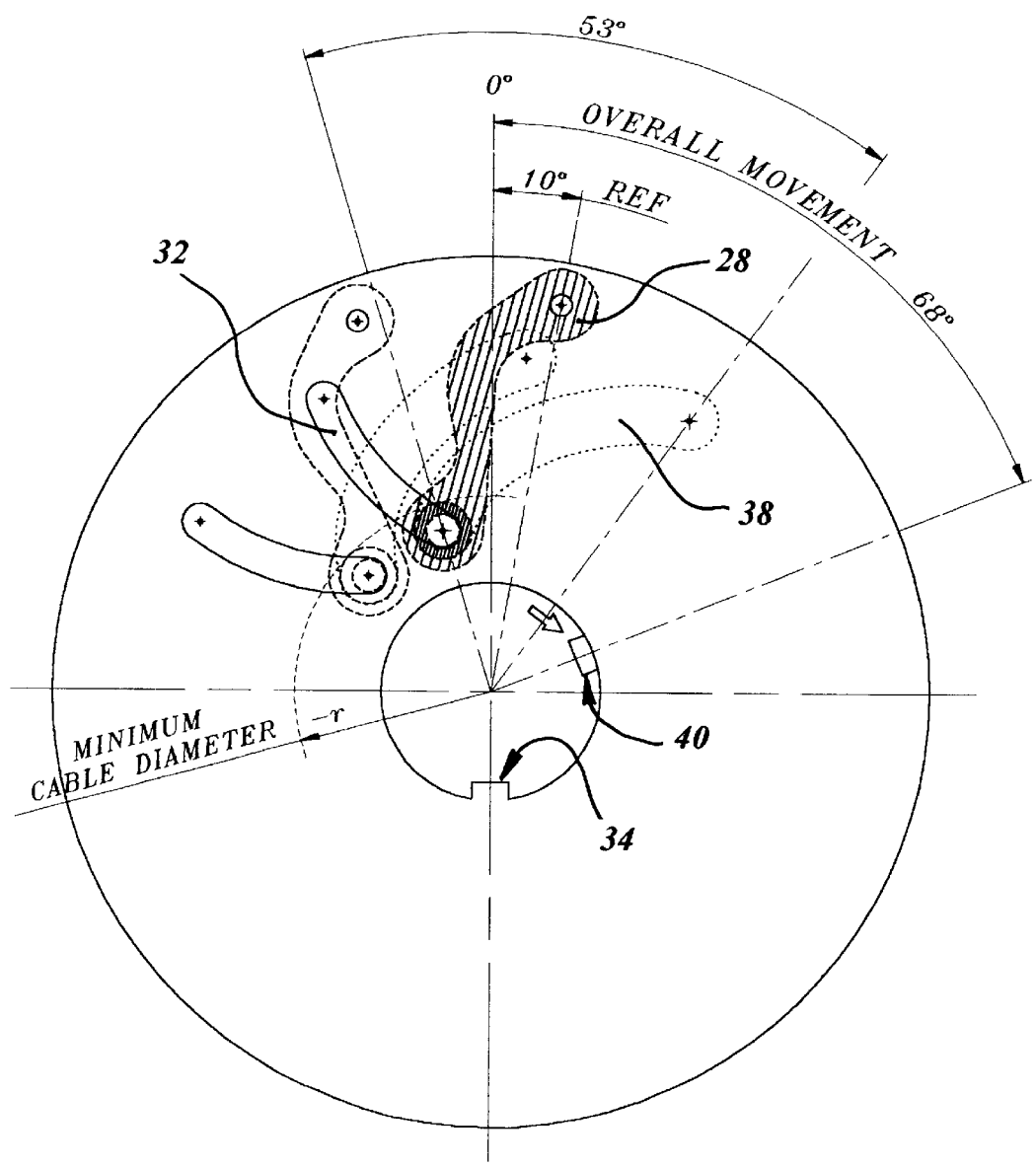
FIG. 6B is a schematic side view of the drum of FIG. 5 showing a second relative position of the positioning discs and adjustment discs corresponding a minimum effective diameter.

As best seen in FIGS. 5, 6A and 6B, adjustment slots 38 are angled such that, when adjustment disc 26 is placed along side positioning disc 24 and rotated, the overlap between curved slot 32 and the corresponding adjustment slot 38 moves along slot 32 between an outermost position (FIG. 6A) and an innermost position (FIG. 6B). Thus, when rods 22 are mounted between arms 28 and through adjustment slots 38, the overall effect of relative rotation between adjustment disc 26 and positioning disc 24 is an increase or decrease in the effective diameter of the drum surface formed by the rods analogous to the operation of the iris mechanism used in cameras. The minimum and maximum effective diameter positions can be seen in input drum 16 and output drum 18, respectively, of FIG. 2.

Further details of a preferred implementation of continuously variable transmission system 14 will now be described with reference to FIGS. 7–13. The internal structure of each drum may best be seen in the exploded view of FIG. 8. As before, each drum includes a pair of positioning discs 24 provided with a set of arms 28, and a pair of adjustment discs 26. In the structure as shown, one of the positioning discs (24b) may be made without slots 32 while the other (24a) requires slots 32 as will be explained below. Annular retaining elements 43 abut the outer edges of positioning discs 24 and attach around adjustment discs 26, thereby maintaining them in close relation.

Arms 28 feature projecting sleeve elements 44 for receiving the ends of rods 22. Sleeve elements 44 are sized such that, when assembled, they engage precisely within adjustment slots 38, thereby accurately defining the position of the rods 22.

In order to maintain structural integrity of the drum under large applied forces, it is important that each pair of discs is rigidly connected so as to function as a single mechanical unit. This may be achieved by use of profiled connectors having a C-shaped cross-section. Thus, positioning disc 24b is integrally formed with a first profiled connector 46. Profiled connector 46 is formed with a shaped end for engaging an alignment ring 48 which, in turn, engages central opening 36 of disc 24a. Similarly, adjustment discs 26 are united by a second profiled connector 50. Profiled connectors 46 and 50 preferably approximate to two co-extensive portions of a substantially cylindrical sleeve such that they can both simultaneously be mounted in contact with the external surface of a central shaft 52. The profiled connectors together preferably encompass significantly less than the entire surface of shaft 52 but more than 180°, and typically between about 240° and about 330° of its circumference. This effectively encloses shaft 52 while allowing relative rotation between the positioning discs and the adjustment discs. The two extreme relative angular positions can be seen most clearly in FIG. 12 corresponding to the minimum effective diameter position in drum 16 and the maximum effective diameter position in drum 18.

A further requirement for proper functioning of the drum is that the relative angular positions of the positioning discs and the adjustment discs be accurately controlled while torque is transmitted to or from the drum by shaft 52. This is achieved by linkage of the angular positions of the two profiled connectors to the axial position of shaft 52. Thus, shaft 52 features a first axially directed slot 54 and a second obliquely angled slot 56. Profiled connectors 46 and 50 feature corresponding projecting pins 58, most clearly seen in FIG. 12, which engage within slots 54 and 56. As a result, axial movement of shaft 52 actuates relative rotation between the positioning discs and the adjustment discs so as to vary the radial positioning of rods 22 and the consequent effective diameter of the drum. Referring again to FIG. 12, the state of drum 16 corresponds to a fully inserted shaft 52 while that of drum 18 corresponds to is a fully withdrawn shaft. The corresponding positions of shaft 52 are clearly seen in FIG. 10. Pins 58 also serve to transfer torque between shaft 52 and discs 24 and 26.

Each drum is mounted rotatably on a fixed axle 53 at one side and a fixed bearing sleeve 55 around shaft 52 at the other. Alignment ring 48 and sleeve 55 are both provided with bearings, as seen in FIG. 10.

It will be apparent that the structure just described allows uninterrupted transmission of torque through shaft 52 to or from the drum while allowing continuous adjustment of the effective diameter of the drum. Typically, the drum is constructed such that the outermost position of shaft 52 corresponds to the maximum effective diameter of the drum and the innermost position corresponds to the minimum effective diameter, although this relation can clearly be reversed.

Figure 10:
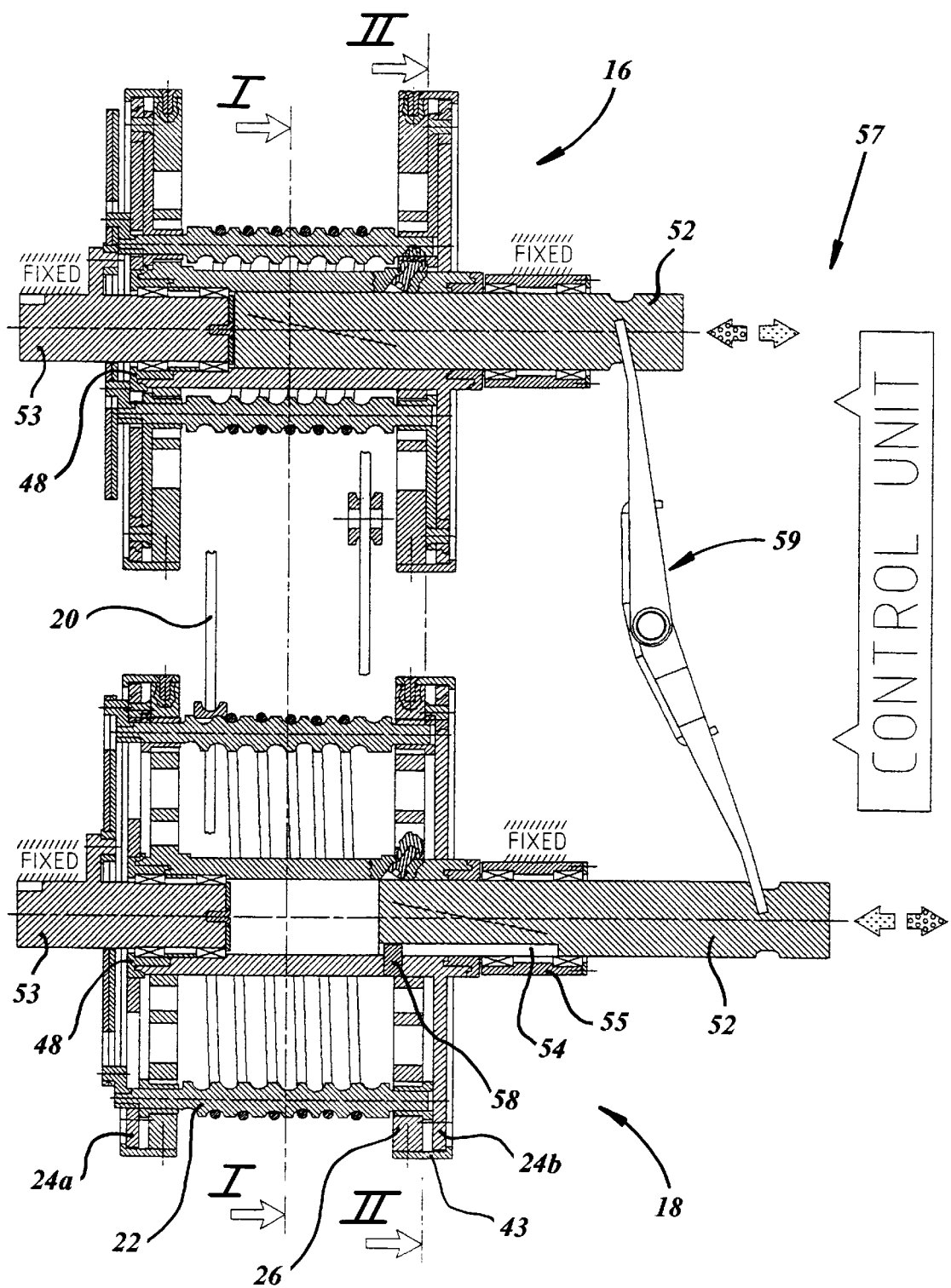
FIG. 10 is a cross-sectional view passing through input and output axles of the implementation of FIG. 7.
Figure 11:
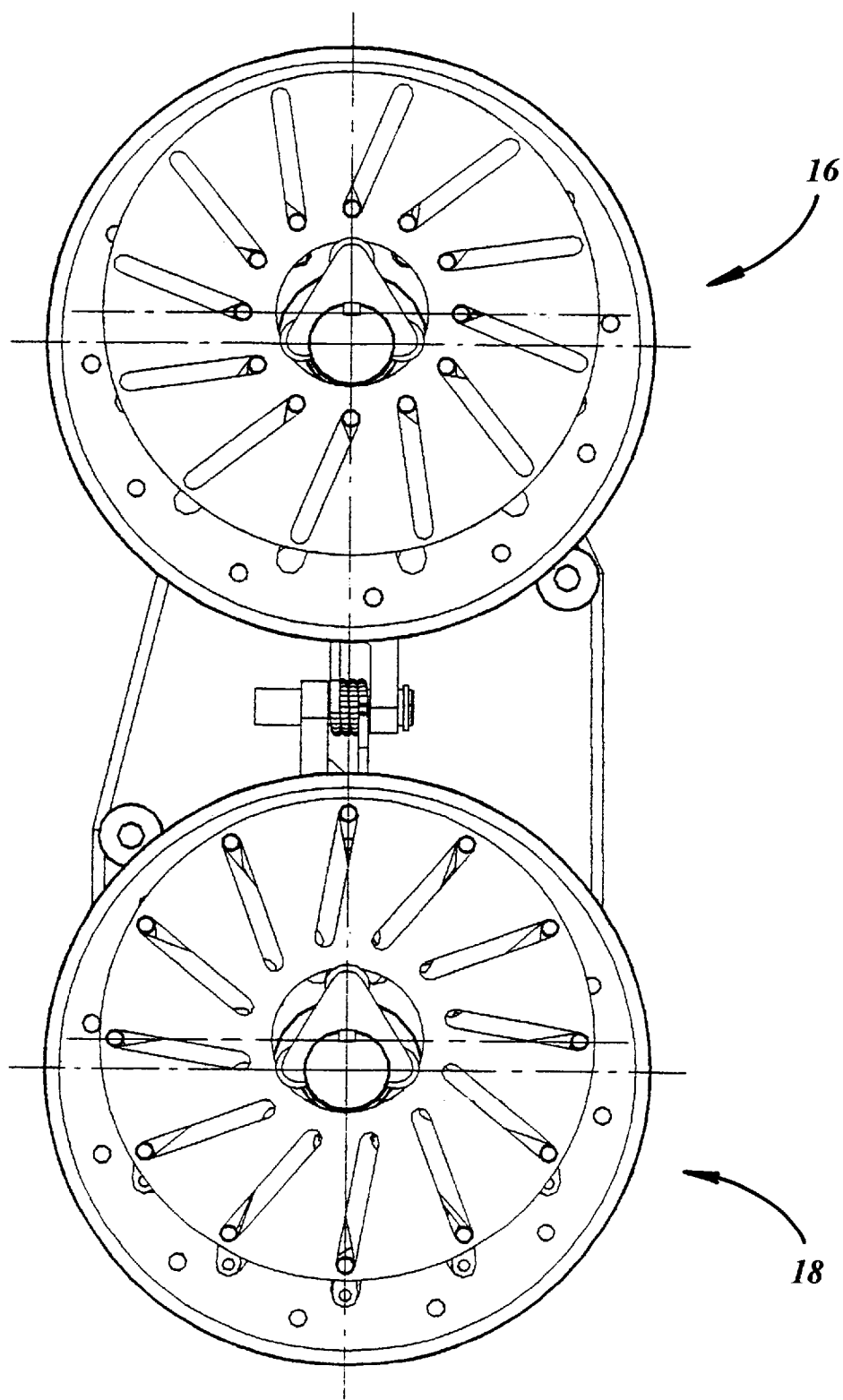
FIG. 11 is a side view of the implementation of FIG. 7.
Figure 12:
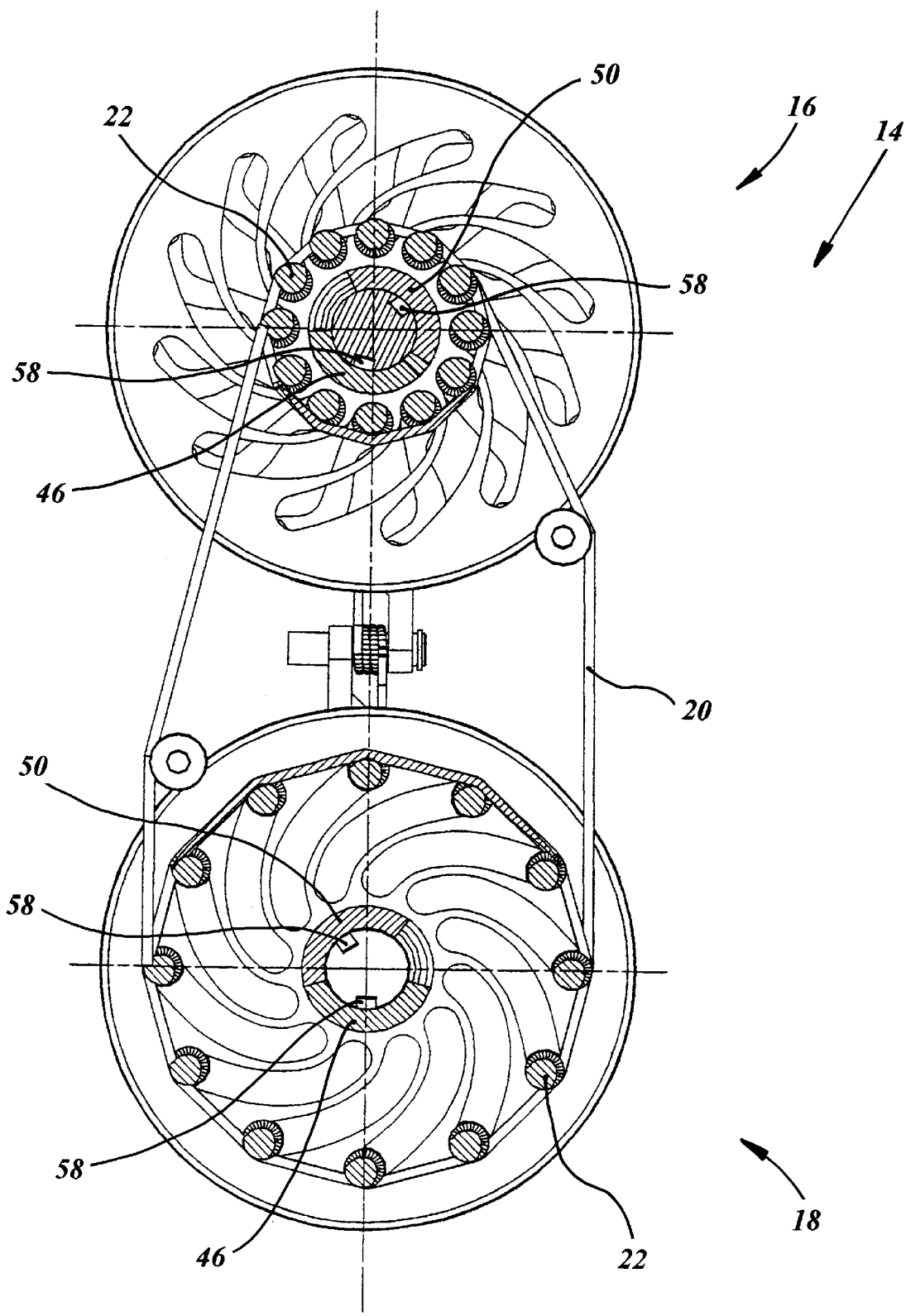
FIG. 12 is a cross-sectional view taken along the line I—I of FIG. 10.
Figure 13:
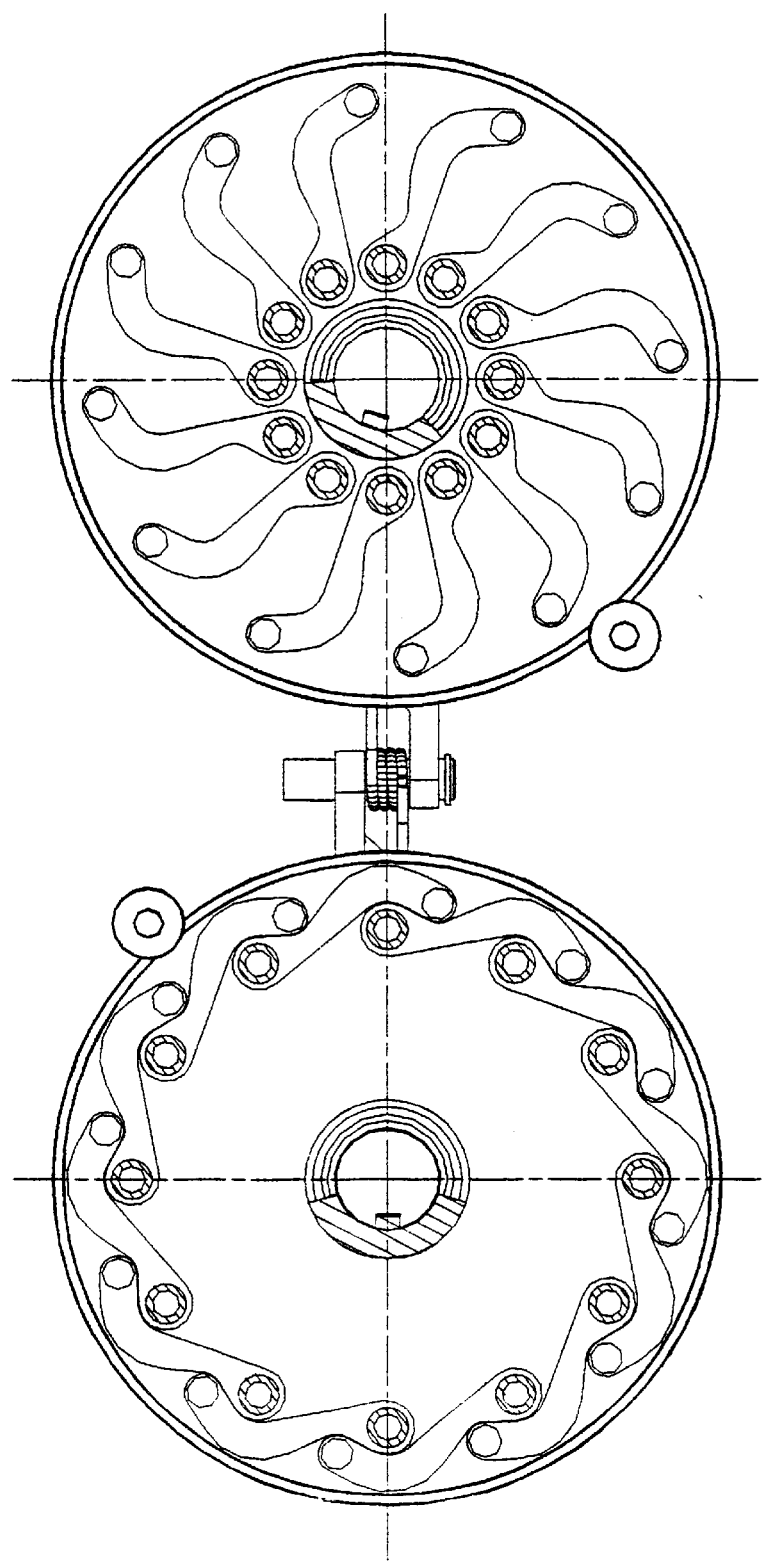
FIG. 13 is a cross-sectional view taken along the line II—II of FIG. 10.
Figure 14:
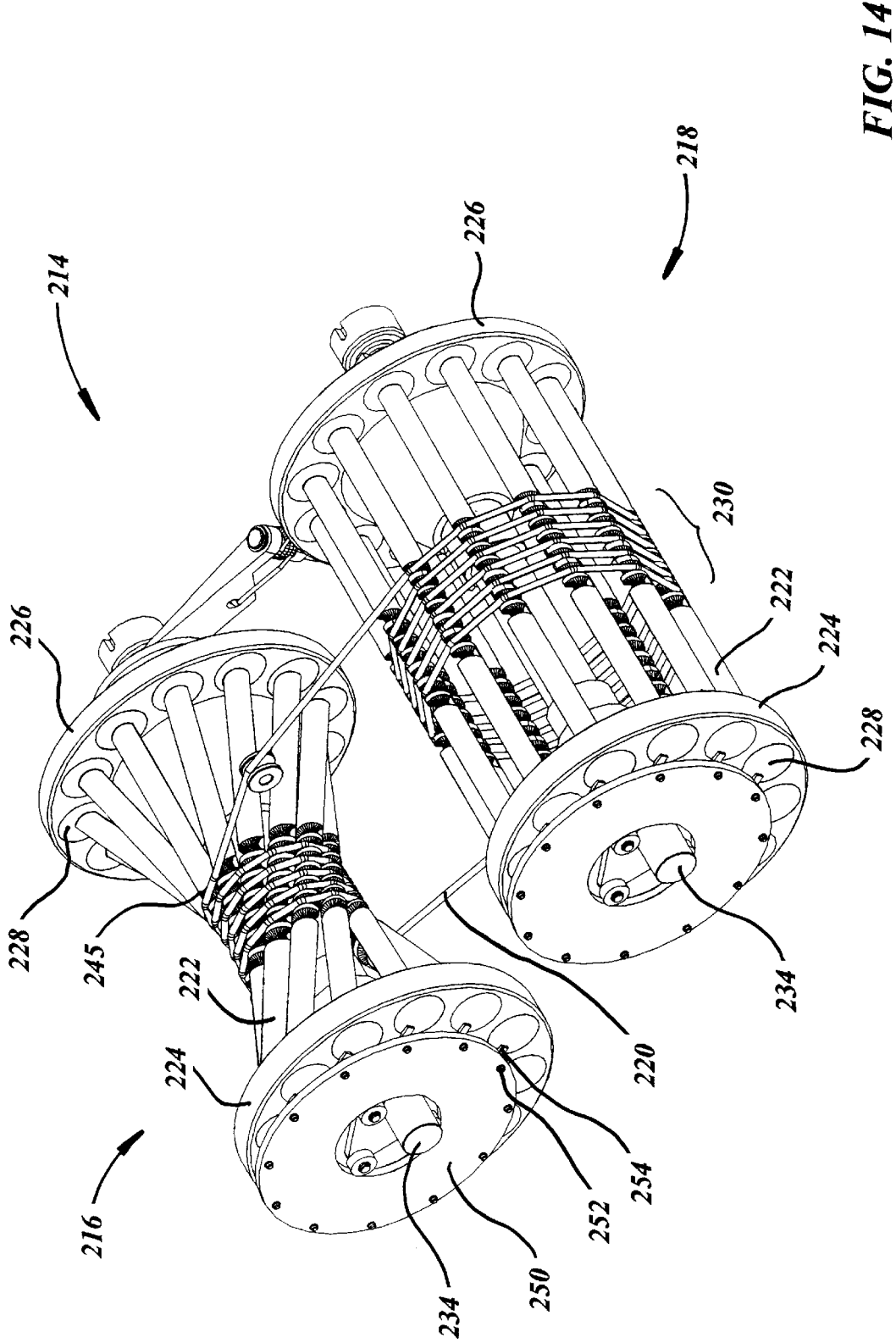
FIG. 14 is an isometric view of a second embodiment of a continuously variable transmission system, constructed and operative according to the teachings of the present invention.

Regulation of the drive ratio of system 14 is achieved by a control mechanism 57, shown schematically in FIG. 10, which includes actuators for displacing shaft 52 of one or other of drums 16 and 18 inwards along the drum's axis of rotation. In this manner, the effective diameter of either drum can be decreased, thereby adjusting the drive ratio.

In order to maintain tension in cable 20, control mechanism 57 also includes a tensioning mechanism 59 operatively connected so as to tend to increase the effective diameter of both drums so as to maintain tension in cable 20. It will be appreciated that, while tensioning mechanism 59 is described as part of control mechanism 57, it may be implemented as a structure mechanically independent from the actuator system. The two are referred to collectively as a control mechanism to reflect their functional connection in that they operate concurrently to ensure proper operation of the transmission system.

One simple implementation of tensioning mechanism 59 shown here employs a centrally pivoted sprung fork device which in configured to apply a fairly constant relatively small outward force on both shafts 52, independent of their current positions. As mentioned earlier, the multiple windings of cable 20 around each drum ensure that frictional locking occurs with relatively small clamping forces. Thus, in one example of a compact system for use in domestic automobiles, a system employing 5½ turns of cable and assuming a friction coefficient of 0.1 (metal against metal in the presence of oil) requires a clamping force of about 30 kg to maintain traction under a force of 950 kg corresponding to a torque of in excess of 35 kg.m. When 6½ turns of cable are used, a clamping force of about 17 kg would be sufficient. If the angle of oblique slot 56 is suitably shallow, the force which need to be exerted by tensioning mechanism 59 can be considerably less than the required clamping force. As a result, the tension generated by the tensioning mechanism need not be particularly large.

It is a further preferred feature of certain embodiments of the present invention that control mechanism 57 is configured to allow overriding of operation of tensioning mechanism 59 so as to release frictional engagement between cable 20 and one or both of drums 16 and 18. For example, the actuators of control mechanism 57 may be used simultaneously to overcome the spring bias provided by tensioning mechanism 59. This provides a particularly simple implementation of a "neutral" transmission state in which the drums can turn independently.

Turning now to a further set of features of preferred embodiments of the present invention, these relate to a mechanism for preventing creep of the cable along the drums. It will be clear that the progression of a cable wound around a rotating drum would normally be accompanied by axial creeping of the cable along the surface of the drum. Given the opposing sense of the windings on the two drums, this creeping would occur in opposite directions for the two drums, leading to misalignment, increased tension, and either slipping or rolling of the cable over the surface. To avoid all these complications, a mechanism for preventing creep of the cable along the drums is provided.

Figure 7:
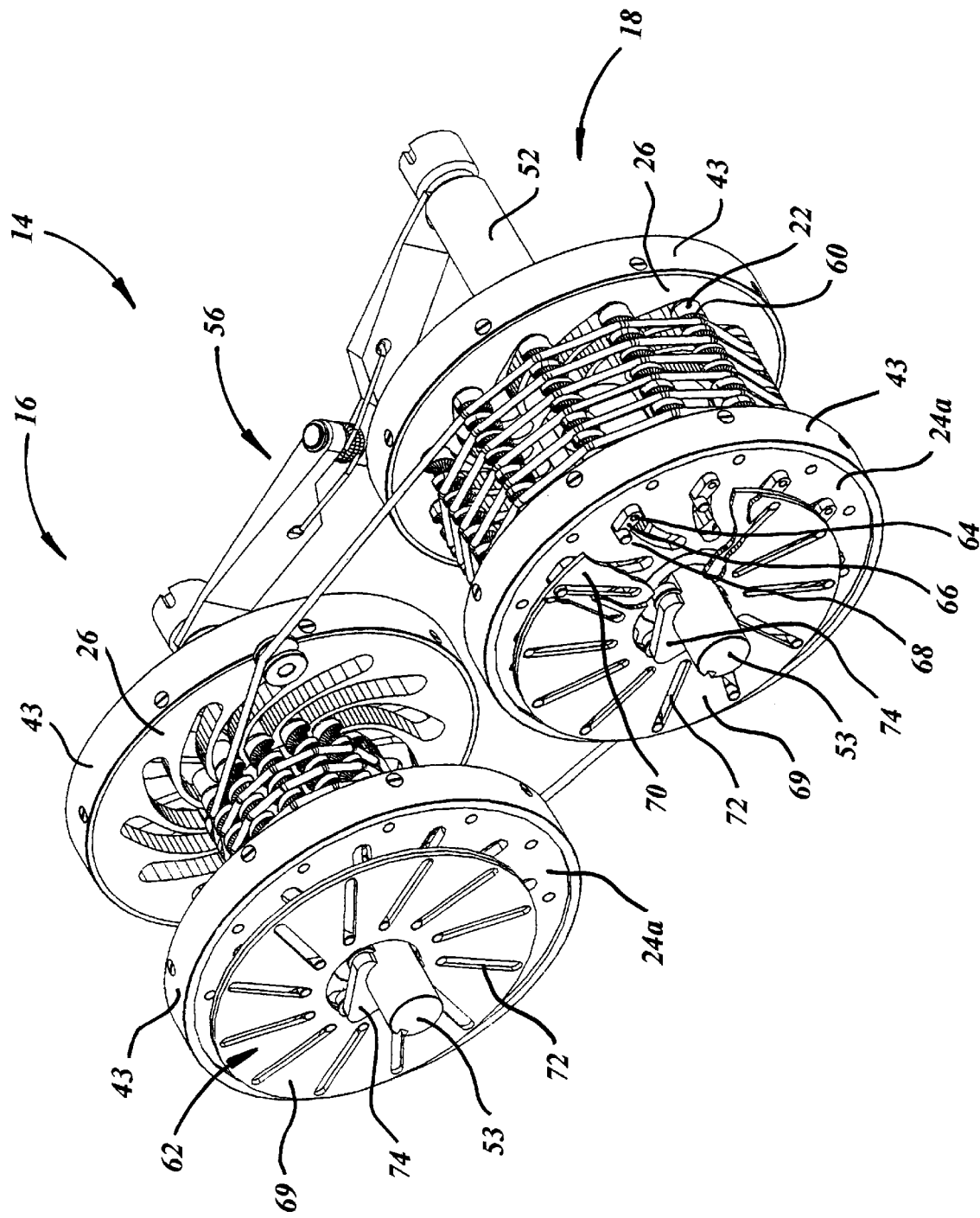
FIG. 7 is an isometric view of a preferred implementation of the continuously variable transmission system of FIG. 2.
Figure 8:
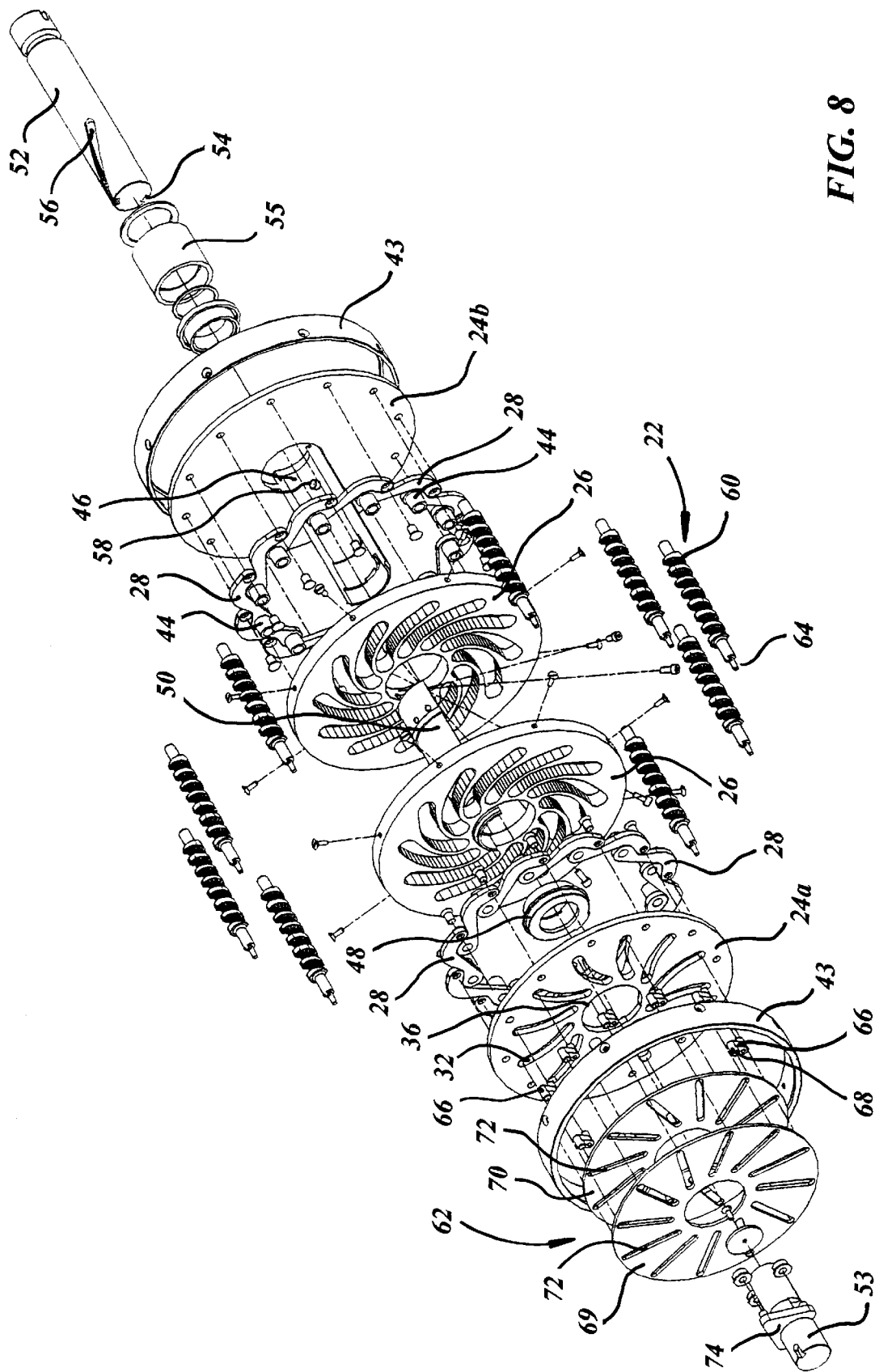
FIG. 8 is an exploded isometric view of one drum from the implementation of FIG. 7.
Figure 9:
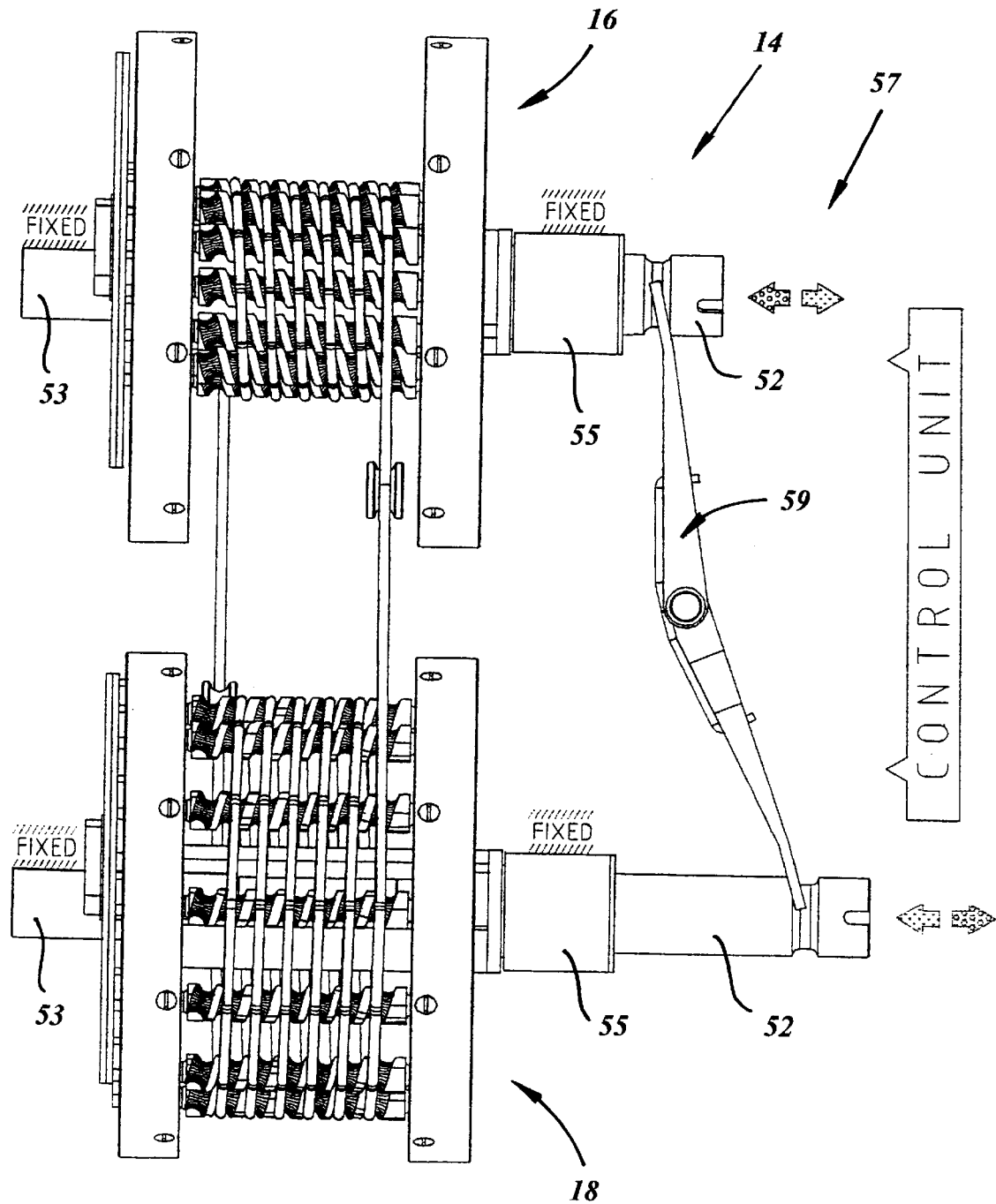
FIG. 9 is a top view of the implementation of FIG. 7.

In a preferred implementation best seen in FIGS. 7–9, the creep-preventing mechanism employs a helical groove 60 formed in each of rods 22 such that cable 20 engages a part of the groove, and a mechanism 62 for rotating rods 22 relative to the ends of the drum so as to change the portion of groove 60 with which the cable engages. Thus, rods 22 work effectively as a set of worm-gears, carrying cable 20 against its direction of tendency to creep so as to maintain its axial position on each drum constant.

Grooves 60 are made right-handed helices in drum 16 and left-handed helices in drum 18 (seen most clearly in FIG. 9) so that the angle presented by the groove does not obstruct the direction of the windings. The shape of the groove is matched to the cross-section of cable used. For a round cable, a U-shaped groove is typically used. For a V-shaped or other type of belt, a matching shape is chosen for the groove.

The spacing of the windings of cable 20 around each drum is preferably equal to the step-per-revolution of helical groove 60 in each rod 22. If rods 22 were rotationally fixed relative to the ends of the drum, the cable would creep one winding spacing for each complete revolution of the drum. Thus, one reverse revolution of each rod 22 relative to the ends of the drum exactly compensates for the creeping effect of one forward revolution of the drum. In a stationary frame of reference, this corresponds to rods 22 maintaining a constant angular orientation as the drum rotates, in a manner similar to a carousel.

The rotation mechanism 62 for achieving this carousel effect is most simply implemented as one or more rotating elements coupled to rods 22 and configured so as to rotate with the drum about a secondary axis parallel to, but displaced from, the axis of rotation of the drum.

In the implementation shown here, best seen in FIGS. 7 and 8, a rotationally asymmetric pin 64 extends from each rod 22 through slot 38, sleeve 44 and slot 32. An offset bracket 66 mounted on pin 64 provides a projecting peg 68. Two annular timing plates 69 and 70 are mounted via rollers at the corners of a triangular bracket 74 attached to axle 53. Triangular bracket 74 is formed so that the effective axis of rotation of timing plates 69 and 70 is displaced from the axis of rotation of the drum by an offset equal to the distance of peg 68 from the central axis of each rod 22.

Pegs 68 engage roughly radial slots 72 in timing plates 69 and 70 such that, when the drum rotates, timing plates 69 and 70 follow the rotation at the same speed. The constant offset between the axes of rotation of the drum and timing plates 69 and 70 maintains all of the offset brackets in constant angular alignment as the drum rotates, producing the desired carousel effect. At the same time, the freedom of pegs 68 to travel along slots 72 accommodates the radial adjustment of the rod positions described above.

In principle, a single timing plate with radial slots would perform the required function. However, at certain points in the rotation where a particular offset bracket 66 lies perpendicular to the length of the corresponding slot 72, there is a slight possibility of peg 68 sliding along the slot. To avert any such possibility, two timing plates with differently angled slots 72 are used in superposition. In the example shown, the slots of one timing plate are angled at up to about 30°, and typically about 10°, in a first direction from radial and those of the other timing plate are similarly angled in the opposite direction from radial. The relative angular positions of the timing plates at any moment then uniquely defines a radial position of overlap between the slots of the two plates through which the pegs 68 pass. Simultaneous radial movement of all of pegs 68 remains unimpeded while radial straying of a single peg independent of the other pegs is prevented.

It will be noted in this context that mechanism 62 is described as a "mechanism for rotating" rods 22 since it varies the angular position of the rods relative to the drum to which they are attached. Although the effect of the mechanism as viewed in a stationary frame of reference is apparently to prevent rotation of the rods, the mechanism does cause rotation of rods 22 relative to the drum with which the rods would otherwise turn.

Although the invention has been illustrated here in relation to a single cable embodiment, it should be noted that it could equally be implemented with two or more cables driving simultaneously. In this case, each rod 22 is formed with multiple grooves 60 formed as a double or triple helix with each cable engaging one groove.

Turning now to FIGS. 14–18, these illustrate a second embodiment of a continuously variable transmission system, generally designated 214, constructed and operative according to the teachings of the present invention.

Continuously variable transmission system 214 is conceptually extremely similar to system 14 described above, also employing a cable 220 wound a plurality of times around input and output drums 216 and 218 which each have a region 230 of variable effective diameter. System 214 differs primarily in the mechanism employed to achieve the variable effective diameter.

Thus, drums 216 and 218 are constructed from a number of rods 222 connected between two end plates 224 and 226. Rods 222 are deployed radially spaced from, and angularly distributed around, the drum's axis of rotation so as to form an effective drum surface. Connection of rods 222 to end plates 224 and 226 is through a universal or swivel joint 228, typically of ball-and-socket type. End plates 224 and 226 can be rotated relative to each other about the drum's axis of rotation so that the configuration of rods 222 varies between a substantially parallel arrangement (the state of drum 218 as shown) and a compact twisted arrangement (the state of drum 216 as shown). This range of adjustment corresponds to a large variation in the effective diameter of the intermediate region 230 of the effective drum surface.

Figure 17:
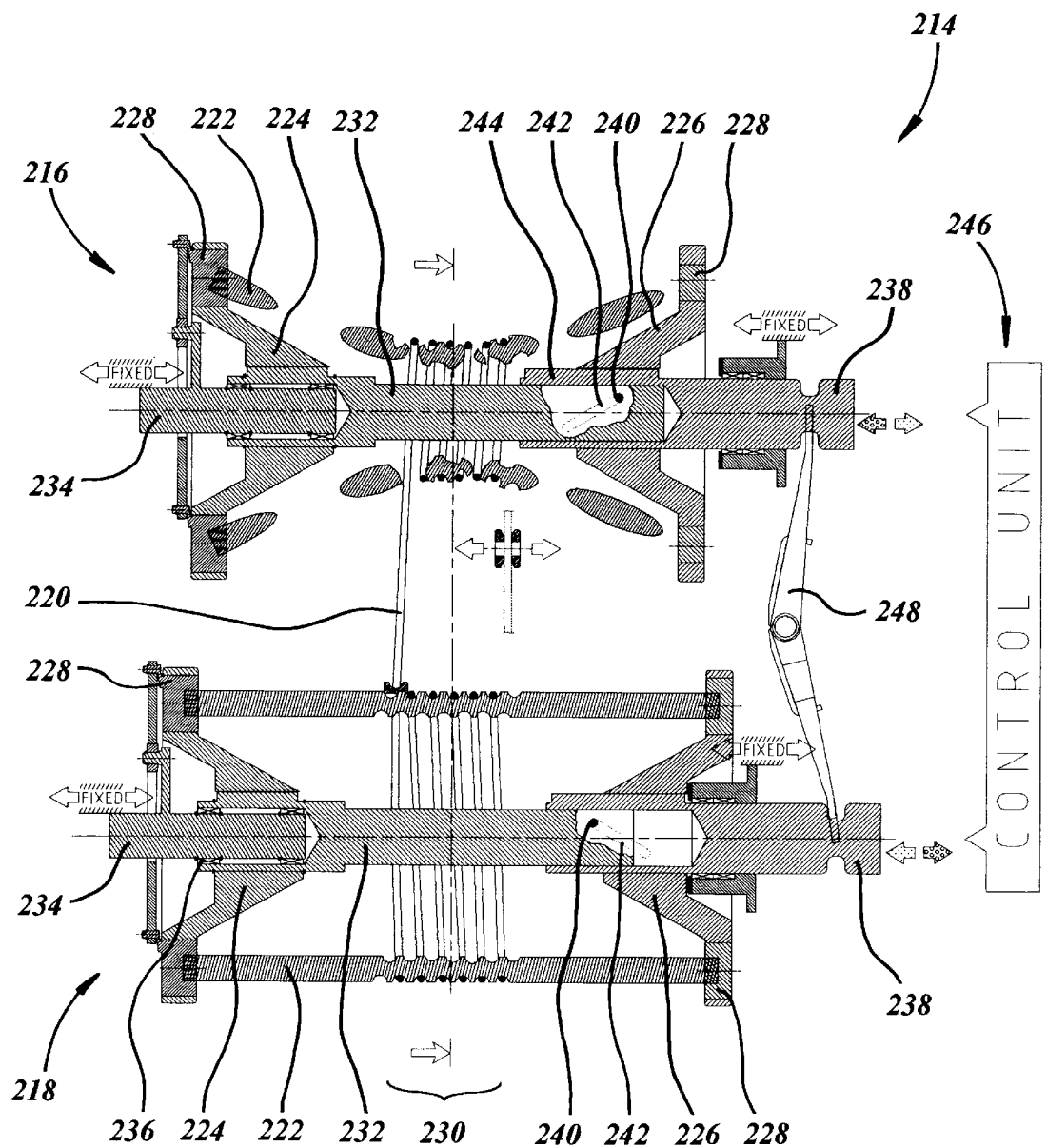
FIG. 17 is a cross-sectional view taken along the line IV—IV of FIG. 16.

A mechanism for controlling adjustment of the effective diameters of drums 216 and 218 will be best understood with reference to FIG. 17. Each drum has an axle 232 which is rotatably mounted on a fixed spindle 234 by a bearing assembly 236. End plate 224 fits as a flange rotationally locked to the outside of axle 232. On the end of axle 232 rides a hollow ended shaft 238 which carries end plate 226. End plate 226 is attached so as to be slidable along shaft 238, but is locked to rotation by a longitudinal ridge 244 along shaft 238 which engages a keyhole slot in end plate 226. Coupling of axle 232 and shaft 238 is achieved by a pin 240 which projects from axle 232 to engage an angled slot 242 in shaft 238. Slot 242 is provided at a shallow angle such that, when a torque is applied to shaft 238, it is transferred through pin 240 to axle 232. By moving shaft 238 axially relative to axle 232, shaft 238 and hence end plate 226 are made to rotate relative to axle 232 and end plate 224.

It will be apparent that the structure described, just like the previous embodiment, allows uninterrupted transmission of torque through shaft 238 to or from the drum while allowing continuous adjustment of the effective diameter of the drum. Specifically, in drum 216 as viewed from the right hand side of FIG. 17, inward axial movement of shaft 238, i.e., towards axle 232, causes rotation of end plate 226 anticlockwise relative to end plate 224. Conversely, drawing outwards of shaft 238 results in a clockwise rotation. Typically, the drum is constructed such that the outermost position of shaft 238 corresponds to the maximum effective diameter of the drum and the innermost position corresponds to the minimum effective diameter.

Here too, system 214 features a mechanism employing rotation of rods 222 provided with helical grooves 245 to prevent creep of the cable along the drums. The details of the system will be described below. At this stage, however, it should be pointed out that the orientation of slot 242 is opposite for drums 216 and 218. As a result, in the same view as above, inward movement of shaft 238 in drum 218 causes clockwise rotation of end plate 226 relative to end plate 224. This ensures that the angle of the helical grooves does not conflict with the direction of winding of the cable for each drum.

Regulation of the drive ratio of system 214 is achieved by a control mechanism 246 which includes actuators for displacing shaft 238 of one or other of drums 216 and 218 inwards along its axis of rotation. In this manner, the effective diameter of either drum can be decreased, thereby adjusting the drive ratio. In order to maintain tension in cable 220, control mechanism 246 also includes a tensioning mechanism 248, typically equivalent to mechanism 59 described above, which tends to increase the effective diameter of the drums so as to maintain tension in said cable. Here too, tensioning mechanism 248 can preferably be overridden to provide a neutral transmission state.

Figure 15:
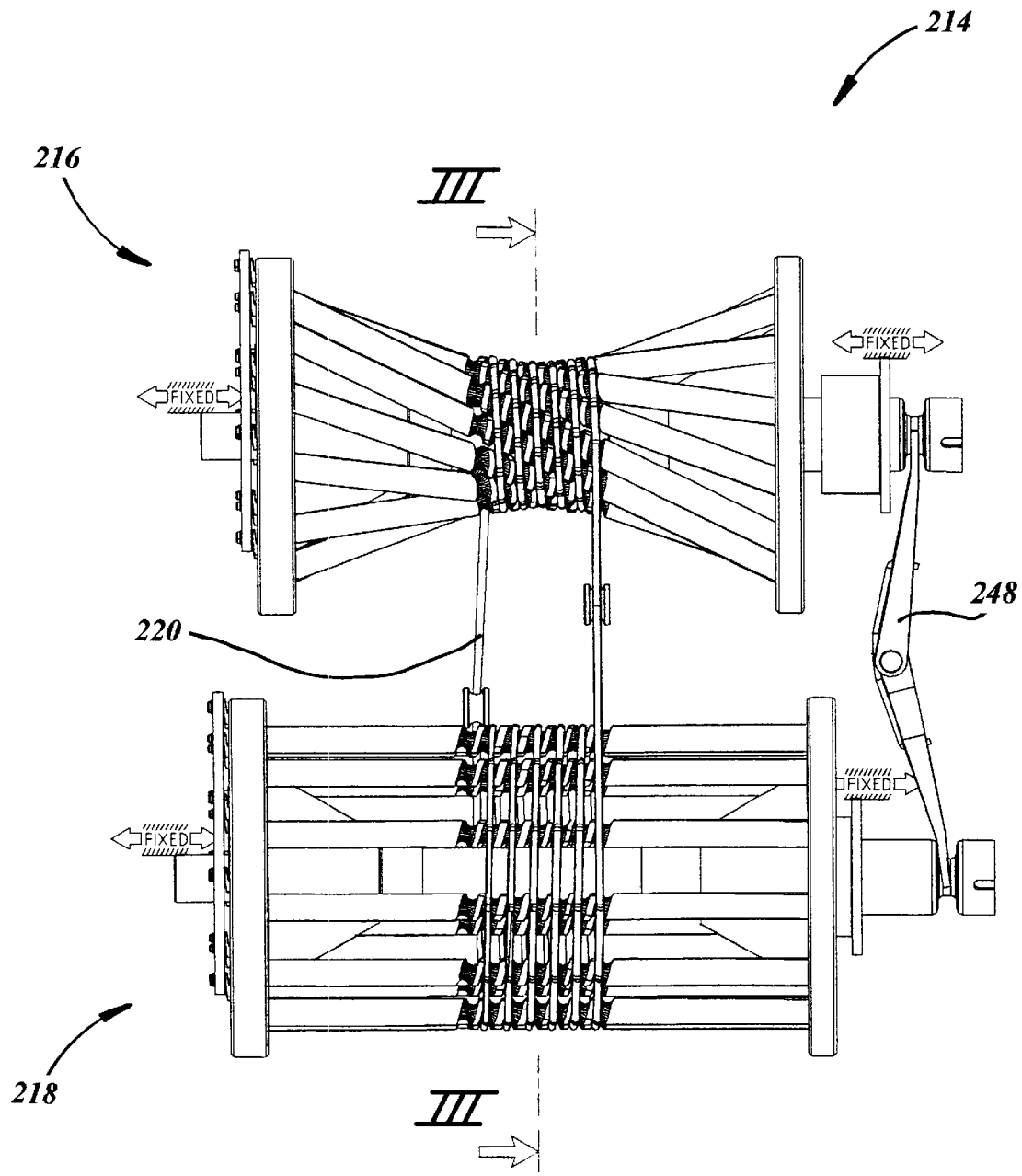
FIG. 15 is a plan view of the continuously variable transmission system of FIG. 14.
Figure 16:
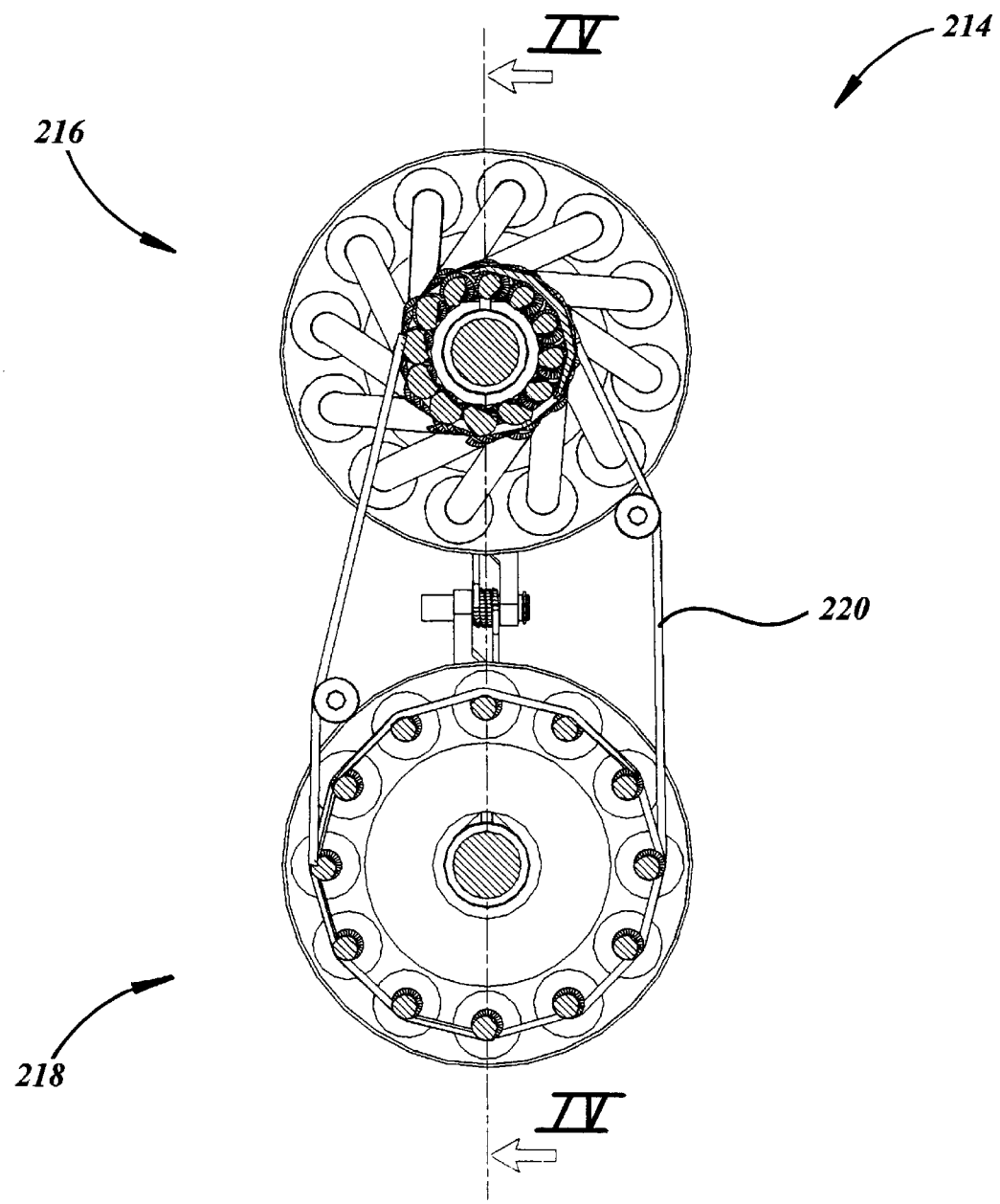
FIG. 16 is a cross-sectional view taken along the line III—III of FIG. 15.

It will be apparent, particularly from FIG. 15, that the distance between end plates 224 and 226 varies according to the current state of the drum. For this reason, it is preferable to provide a centering mechanism of some kind (not shown) for moving one or both of drums 216 and 218 axially so as to maintain alignment of adjustable regions 230 as the transmission ratio is varied. The centering mechanism may be implemented in a large number of ways including, but not limited to, a fork or scissors type mechanism for each drum with its central pivot slidable perpendicular to the drum axis, or a hydraulic actuator controlled directly by the transmission control system.

Turning now to the implementation of the mechanism for preventing creep of the cable along the drum, this is conceptually identical to the mechanism described in the previous embodiment. A structural simplification is achieved as a consequence of the constant radial positions of the ends of rods 222: a single timing plate 250 with non-sliding pivotal connections 252 to offset brackets 254 here replaces the double, slotted timing plates of the previous embodiment.

Figure 18:
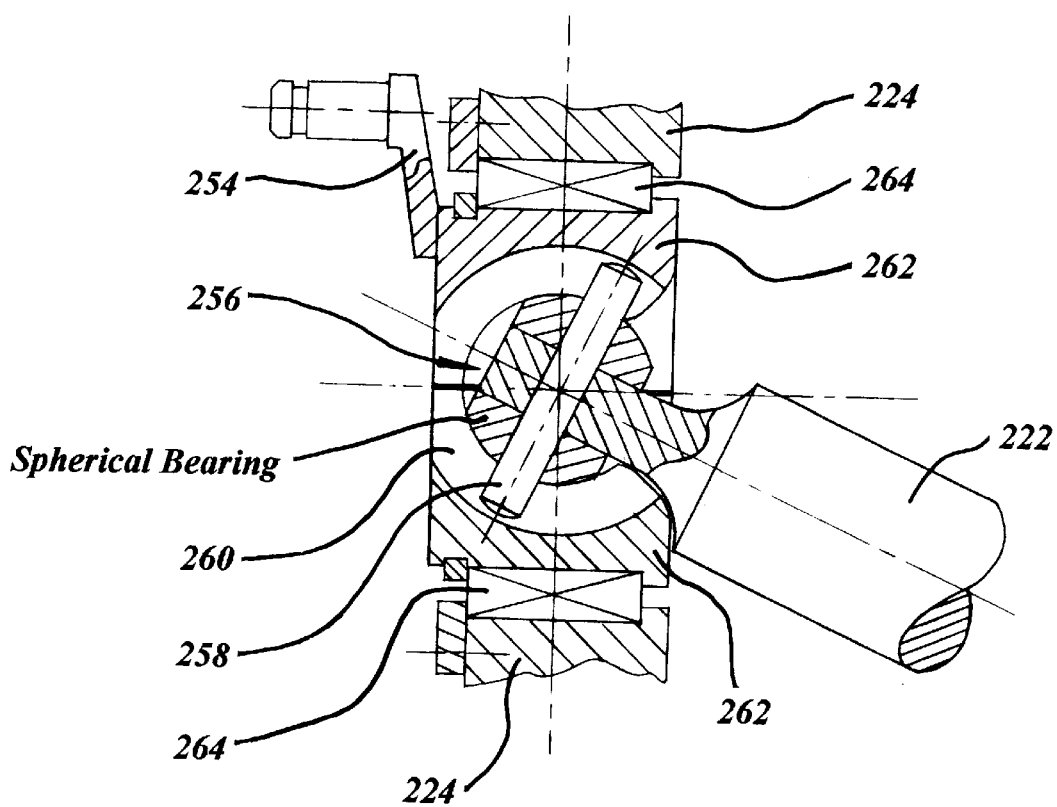
FIG. 18 is an enlarged cross-sectional view of a rod rotating coupling for use in the continuously variable transmission system of FIG. 14.

The coupling of offset brackets 254 to rods 222, on the other hand, is somewhat complicated by the need for a universal connection. One possible coupling structure is shown in FIG. 18 in which the rotational freedom of an otherwise conventional ball-and-socket joint 256 is limited by a central pin 258, perpendicular to the length of rod 222, which travels in an annular slot 260 around joint 256. This structure allows the required two-degrees of pivotal freedom for rod 222 while preventing rotation of rod 222 about its own axis relative to the joint housing 262. The joint housing 262 itself which carries offset bracket 254 is then mounted rotatably within end plate 224 via bearings 264. Turning of offset bracket 254 relative to end plate 224 results in axial rotation of rod 222 in whatever pivotal position it happens to be.

It will be appreciated that the above descriptions are intended only to serve as examples, and that many other embodiments are possible within the spirit and the scope of the present invention.

What is claimed is:

1. A continuously variable transmission system for coupling between a rotating drive shaft and an output shaft, the system comprising:

(a) a first drum having an axis of rotation, said first drum being operatively connected to the drive shaft so as to be rotated by the drive shaft;

(b) a second drum having an axis of rotation, said second drum being positioned with its axis of rotation substantially parallel to said first drum's axis of rotation, said second drum being operatively connected to the output shaft, wherein at least one of said first drum and said second drum has a region of adjustable effective diameter; and (c) a closed cable encircling said first and said second drums, wherein said cable is wrapped around each of said first and said second drums a plurality of times.

2. The transmission system of claim 1, wherein said cable is wrapped around said first drum in a first-handed helix and around said second drum in a second-handed helix of opposite sense to said first-handed helix.

3. The transmission system of claim 1, further comprising a tensioning mechanism operative to maintain tension in said cable.

4. The transmission system of claim 3, wherein both said first and said second drums have a region of adjustable effective diameter, and wherein said tensioning mechanism is operatively connected to said first and second drums so as to tend to increase the effective diameter of said region of said first and second drums to as to maintain tension in said cable.

5. The transmission system of claim 3, further comprising an override mechanism for overriding operation of said tensioning mechanism such that frictional engagement between said cable and at least one of said drums is released so as to correspond to a "neutral" transmission state.

6. The transmission system of claim 1, wherein at least one of said first and said second drums includes a mechanism for preventing creep of said cable along the drum.

7. The transmission system of claim 6, wherein said mechanism for preventing creep of said cable along the drum includes:

(a) at least one element having a helical groove deployed such that said cable engages a part of said groove; and (b) a mechanism for rotating said at least one element so as to change the portion of said groove with which said cable engages.

8. The transmission system of claim 1, wherein said at least one of said first drum and said second drum which has a region of adjustable effective diameter includes:

(a) a plurality of rods deployed radially spaced from, and angularly distributed around, said axis of rotation so as to form an effective drum surface; and (b) an adjustment mechanism for varying the radial spacing from said axis of rotation of at least a part of each of said rods so as to vary an effective diameter of at least a region of said effective drum surface.

9. The transmission system of claim 8, wherein said at least one drum further includes a shaft for transferring torque to or from said drum, said shaft being coupled to said adjustment mechanism such that displacement of said shaft along said axis of rotation varies said effective diameter.

10. The transmission system of claim 8, wherein said at least one of said first drum and said second drum which has a region of adjustable effective diameter includes both said first drum and said second drum.

11. The transmission system of claim 10, further comprising a control mechanism operatively connected to said adjustment mechanism of both said first and second drums and configured to selectively reduce the effective diameter of one of said drums so as to adjust a ratio of effective diameters between said first and second drums.

12. The transmission system of claim 11, wherein said control mechanism further includes a tensioning mechanism configured so as to tend to increase the effective diameter of both said first and second drums so as to maintain tension in said cable.

13. The transmission system of claim 12, wherein said control mechanism is configured to allow overriding of operation of said tensioning mechanism such that frictional engagement between said cable and at least one of said drums is released so as to correspond to a "neutral" transmission state.

14. The transmission system of claim 8, wherein said at least one drum includes a mechanism for preventing creep of said cable along the drum, said mechanism including:

(a) a helical groove formed in each of said rods such that said cable engages a part of said groove; and (b) a mechanism for rotating said rods relative to said at least one drum so as to change the portion of said groove with which said cable engages.

15. The transmission system of claim 14, wherein said mechanism for rotating is configured to maintain the rotational orientation of said plurality of rods constant as viewed in a stationary frame of reference independent of rotation of said at least one drum.

16. The transmission system of claim 14, wherein said mechanism for rotating includes a rotating element coupled so as to rotate with said at least one drum about a secondary axis parallel to, but displaced from, the axis of rotation of said at least one drum.

* * * * *